United States Patent [19]

Muller et al.

[11] 4,200,624
[45] Apr. 29, 1980

[54] COMBINED HYDROGEN STORAGE AND PRODUCTION PROCESS

[75] Inventors: Alain Muller; Philippe Engelhard; Joseph E. Weisang, all of Le Havre, France

[73] Assignee: Compagnie Francaise de Raffinage, Paris, France

[21] Appl. No.: 954,649

[22] Filed: Oct. 25, 1978

[30] Foreign Application Priority Data

Oct. 27, 1977 [FR] France ................... 77 32498

[51] Int. Cl.$^2$ ............................................. C01B 6/24
[52] U.S. Cl. ................................. 423/644; 423/647; 423/648 R; 34/15; 75/168 R; 75/168 J; 75/168 K; 75/170; 75/175.5; 75/176
[58] Field of Search ............... 423/644, 647, 648 R; 75/168 J, 170, 175.5, 176; 34/15

[56] References Cited

U.S. PATENT DOCUMENTS

| | | | |
|---|---|---|---|
| 3,479,165 | 11/1969 | Lyon | 423/647 |
| 3,922,872 | 12/1975 | Reilly et al. | 423/644 |
| 4,107,405 | 8/1978 | Percheron et al. | 75/170 |
| 4,126,242 | 11/1978 | Yajima et al. | 75/168 J |

OTHER PUBLICATIONS

Van Mal et al., "Journal of Less Common Metals", vol. 35, 1974, pp. 65–76.

*Primary Examiner*—Herbert T. Carter
*Attorney, Agent, or Firm*—Curtis, Morris & Safford

[57] ABSTRACT

In a combined process for the storage and production of hydrogen from a hydrogen reserve containing magnesium in the free or combined state, said process consisting of storing the hydrogen in the supply, decomposing the supply to produce hydrogen, and reconstituting the supply of hydrogenation; the use of a dope comprising two elements in the free or combined state selected from the group consisting of cerium, nickel, titanium and molybdenum.

Said process may be applied to hydrogen reserves used to fuel internal-combustion engines and for similar applications.

10 Claims, No Drawings

COMBINED HYDROGEN STORAGE AND PRODUCTION PROCESS

The present invention relates to a combined process for the storage and production of hydrogen from a hydrogen reserve and to applications of said process.

Growing energy needs have prompted specialists to take cognizance of the fact that the traditional energy resources, such as coal, petroleum or natural gas, are not inexhaustible, or at least that they are becoming costlier all the time, and that it is advisable to consider replacing them with other energy sources, such as nuclear energy, solar energy or geothermal energy. Hydrogen, too, is coming into use as an energy source.

Hydrogen may be used, for example, as fuel for internal-combustion engines in place of hydrocarbons. In this case, it has the advantage of eliminating atmospheric pollution through the formation of oxides of carbon or of sulfur upon combustion of the hydrocarbons. Hydrogen may also be used to fuel hydrogen-air fuel cells for production of the electricity needed for electric motors.

One of the problems posed by the use of hydrogen is its storage and transportation. A number of solutions have have proposed:

Hydrogen may be stored under high pressure in steel cylinders. But this approach has the drawback of requiring hazardous and heavy containers which are difficult to handle.

Hydrogen may also be stored in cryogenic containers. But this entails the disadvantages associated with the use of cryogenic liquids, such as, for example, the high cost of the containers, which also require careful handling.

Another method of storing hydrogen is to store it in the form of a hydride, which then is decomposed at the proper time to furnish hydrogen. The hydrides of iron-titanium, lanthanum-nickel, vanadium, and magnesium have been used in this manner, as described in French Pat. No. 1,529,371.

The use of magnesium hydride holds promise because the hydrogen content of the hydride may, in the case of the stoichiometric hydride, $MgH_2$, represent up to 8.3% of the weight of the magnesium it contains.

However, the use of magnesium for the storage of hydrogen in the form of magnesium hydride is not entirely satisfactory. In fact at a pressure of 1 bar, a temperature of about 400° C. is required to decompose magnesium hydride; which lessens the economic interest and practical uses of such a hydrogen reserve considerably.

Moreover, the hydrogen capacity of such a reserve diminishes during the decomposition-reconstitution cycles. This phenomenon may be explained by a progressive poisoning of the surface which during the reconstitution renders the magnesium atoms located in the interior of the reserve inaccessible to the hydrogen.

The applicants have found ways and means of rendering the use of magnesium for the storage of hydrogen more economical while avoiding the gradual diminution of the capacity of the reserve.

Thus an object of the present invention is to perfect the storage and production of hydrogen from a reserve comprising magnesium.

A preferred embodiment of the present invention comprises a combined process for the storage and production of hydrogen from a hydrogen reserve containing magnesium in the free or combined state, which involves storing the hydrogen in the reserve, decomposing the reserve to produce hydrogen, and reconstituting the reserve by hydrogenation, wherein the improvement in said process comprises said reserve further containing a dope formed of at least two elements, in the free or combined state, selected from the group consisting of cerium, nickel, titanium and molybdenum.

Other preferred embodiments of the present invention include the application of the process in accordance with the invention to the propulsion of motor vehicles and to the making of fixed reserves.

In the process according to the invention, the reserve thus contains, in addition to magnesium and hydrogen, at least two of the aforesaid elements. These two elements form a dope which permits the liberation of the hydrogen by the reserve at a temperature that is lower than it would be if the reserve contained only magnesium, and further permits the hydrogen capacity of the reserve to be maintained at a satisfactory level.

The applicants have successfully used the following combinations as dope: Cerium-nickel, titanium-nickel, and titanium-molybdenum.

The reserves suitable for use in the process in accordance with the invention may contain from 1 to 99.9% by weight of magnesium. They preferably contain not less than 50% by weight of magnesium, the storage capacity of the latter being clearly superior to that of the dope. The reserves which may be used in the process in accordance with the invention may be obtained by mixing magnesium powder with the finely divided dope, which may be formed by an alloy, for example, of the two elements selected. For mixing with he magnesium, these elements may also be used in the pure state, each element being in the metallic state.

The mixture is compacted, then possibly subjected to a heat treatment under an atmosphere that is inert relative to the reserve, such as, for example, a helium atmosphere, at a temperature between 400° and 1,600° C., and preferably between 600° and 1,100° C. (see applicants' concurrently filed application Ser. No. 954,648.

The mixture is then hydrogenated with a view to obtaining the reserve, at a temperature between 20° and 500° C., and preferably between 150° and 380° C., and at a pressure between 0.1 and 200 bars, and preferably between 10 and 100 bars.

The reserve may then be decomposed to furnish hydrogen, at a temperature between 100° and 500° C., and preferably between 150° and 380° C., and a pressure between 0.1 and 150 bars, and preferably between 1 and 10 bars.

The reserve may then be reconstituted by hydrogenation under the same operating conditions as those employed in its formation.

The process in accordance with the invention may be applied in particular to the storage of the hydrogen necessary for the propulsion of motor vehicles. These vehicles may be powered by internal-combustion engines or electric motors, with the hydrogen feeding a fuel cell in the latter case.

In the case of internal-combustion engines, the temperature of the exhaust gases in sufficient to permit the decomposition of the hydrogen reserve and thus the fueling of the engine with hydrogen.

Moreover, since the weight percentage of the available hydrogen may be as high as 8.3%, based on the weight of the magnesium, the hydrogen reserves in accordance with the invention compare favorable with other possible sources of hydrogen for the propulsion of motor vehicles; such as pressurized cylinders, cryogenic containers, or other hydrides.

The process in accordance with the invention may also be applied to the storage of hydrogen in fixed reserves, particularly for supplying hydrogen compressors, and these reserves may be reconstituted after use.

The following non-restrictive examples relate to the preparation of hydrogen reserves for the production and storage of hydrogen in accordance with the process of the invention.

As pointed out above, the reserves are generally obtained by mixing magnesium with at least two metals selected from the group consisting of cerium, titanium, nickel and molybdenum, or with an alloy containing two of said elements.

After being shaped by compacting, possibly followed by a heat treatment, the mixture is hydrogenated to form the hydrogen reserve. During the hydrogenation, the mixture fixes a certain amount of hydrogen, which amount depends on the temperature and pressure at which the hydrogenation is effected as well as on its duration.

In the description of the examples, "initial capacity" means the amount of hydrogen fixed during the first hydrogenation of the mixture carried out to obtain the reserve. Said "initial capacity" is expressed as a percentage of the total weight of the mixture before the first hydrogenation. In defining this "initial capacity", the operating conditions of the hydrogenation will be given.

The reserves are then subjected to hydrogen production and fixation cycles by decomposition and reconstitution of the reserve.

The amounts of hydrogen liberated and fixed are measured by thermogravimetry, which permits calculation of:

1. The "average reserve capacity", or average amount of hydrogen liberated or fixed, which is obtained by taking the average of the results of a certain number of cycles. Said "average reserve capacity" is expressed as a percentage of the total weight of the initial mixture before the first hydrogenation.

2. The "average magnesium capacity", or average amount of hydrogen liberated or fixed, which is obtained by taking the average of the results of a certain number of cycles. Said "average magnesium capacity" is expressed as a percentage of the weight of the magnesium contained in the initial mixture before the first hydrogenation.

EXAMPLE 1

This example relates to the preparation of six hydrogen reserves A1, A2, A3, A4, A5 and A6 containing magnesium, cerium, and nickel; said reserves then being sub- subjected to tests consisting of decomposition and reconstitution cycles.

Preparation of reserves A1 and A2

The reserves A1 and A2 are prepared in an identical manner.

From magnesium powder of a particle size of $100\mu$ and a powder of a cerium-nickel, $CeNi_5$, alloy of a particle size of $15\mu$, two mixtures containing 54 wt. % magnesium and 46 wt. % $CeNi_5$ alloy (i.e., 15% cerium and 31% nickel) are made. These mixtures are then compacted under a pressure of 20 tons/cm². The pellets obtained are heated to 800° C. over a period of 3½ hr. under a helium stream.

The pellets are then hydrogenated for 1 hr. at 320° C. at a hydrogen pressure of 100 bars.

In this way the reserves A1 and A2, whose "initial capacities" are 2%, are obtained.

Preparation of reserves A3, A4, A5 and A6

From magnesium, cerium and nickel powders of particle sizes of 100, 200 and $15\mu$, respectively, mixtures are made which are compacted under a pressure of 20 tons/cm². The pellets obtained are heated to an elevated temperature under a helium stream. The pellets are then hydrogenated for 1 hr. at a pressure of 100 bars. Thus the reserves A3, A4, A5 and A6 are obtained. Their composition and the details of their preparation are set forth in Table 1 below.

Table 1

| Reserve | Composition wt. % | | | Heat treatment | | Hydrogenation temperature °C. | Initial capacity % |
|---------|----|----|----|------|------|-----|------|
|         | Mg | Ce | Ni | Temp. °C. | Time hr |  |  |
| A3 | 54 | 15 | 31 | 810 | 4 | 220 | 3.3 |
| A4 | 54 | 15 | 31 | 810 | 4 | 220 | 3.3 |
| A5 | 65 | 11 | 24 | 720 | 5 | 300 | 4 |
| A6 | 60 | 14 | 26 | 720 | 5 | 290 | 3.85 |

Decomposition and reconsititution tests

The reserves A1, A2, A3, A4, A5 and A6 are subjected to decomposition and reconstitution cycles.

The conditions and results of the tests are presented in Table 2 which follows.

Table 2

| Reserve | Decomposition pressure, bars | Reconstitution pressure bars | Temperature of decomposition and reconstitution, °C. | n | Average capacity over n cycles | |
|---------|----|-----|-----|----|------|-----|
|  |  |  |  |  | Aver. reserve capacity % | Aver. magnesium capacity % |
| A1 | 1 | 100 | 317 | 3  | 1.8  | 3.3 |
| A2 | 1 | 100 | 329 | 3  | 1.98 | 3.7 |
| A3 | 1 | 80  | 310 | 4  | 3.2  | 5.9 |
| A4 | 1 | 100 | 307 | 7  | 3.25 | 6   |
| A5 | 1 | 80  | 300 | 10 | 4    | 6.2 |
| A6 | 1 | 80  | 290 | 10 | 3.85 | 6.4 |

The good capacity of reserves A1, A2, A3, A4, A5 and A6 is apparent from this table.

The percentage of hydrogen liberated may be higher than 6%, provided that the decomposition temperature is about 200° C. As is apparent, the best result is obtained when the elements cerium and nickel are used (A3, A4, A5 and A6) rather than the cerium-nickel alloy (A1 and A2).

EXAMPLE 2

This example relates to the preparation of four hydrogen reserves B1, B2, B3 and B4 containing magnesium, titanium and nickel. These reserves are then subjected to tests consisting of decomposition and reconstitution cycles.

Preparation of reserve B1

From magnesium powder of a particle size of $100\mu$ and a powder of a titanium-nickel, Ti-Ni, alloy of a particle size of $10\mu$, a mixture containing 90 wt. % of magnesium and 10 wt. % of a Ti-Ni alloy (i.e., 5.5% nickel and 4.5% titanium) is made. This mixture is compacted under a pressure of 20 tons/cm².

The pellet obtained is hydrogenated for 2 hr. at 303° C. at a hydrogen pressure of 80 bars.

In this way the reserve B1, whose "initial capacity" is 4%, is obtained.

Preparation of reserve B2

From magnesium, titanium and nickel powders of particle sizes of 100, 25 and 15μ, respectively, a mixture containing 47 wt. % magnesium, 24 wt. % titanium and 29 wt. % nickel is made.

This mixture is compacted under a pressure of 20 tons/cm². The pellet obtained is heated to 900° C. over a period of 4 hr. under a helium stream.

The pellet is then hydrogenated for 15 min. at 215° C. at a hydrogen pressure of 80 bars. Thus the reserve B2, whose "initial capacity" is 1.3%, is obtained.

Preparation of reserve B3

This reserve is prepared from a mixture containing 79.7 wt. % magnesium, 9.6 wt. % titanium and 11.7 wt. % nickel.

This reserve is prepared in the same manner as the reserve B2. Hydrogenation is for 10 min. at 164° C. at a hydrogen pressure of 100 bars.

In this way the reserve B3, whose "initial capacity" is 0.81%, is obtained.

Preparation of reserve B4

This reserve is prepared from a mixture containing 89.4 wt. % magnesium, 4.8 wt. % titanium and 5.8 wt. % nickel.

This reserve is prepared in similar fashion to the reserves B2 and B3. Hydrogenation is for 20 min. at 169° C. at a hydrogen pressure of 90 bars.

Thus the reserve B4, whose "initial capacity" is 1.07%, is obtained.

Decomposition and reconstitution tests

The reserves B1, B2, B3 and B4 are subjected to decomposition and reconsitution cycles.

The conditions and results of the tests are presented in Table 3 which follows.

Table 3

| Reserve | Decomposition pressure, bars | Reconstitution pressure, bars | Temperature of decomposition and reconstitution, °C. | Average capacity over n cycles | | |
|---|---|---|---|---|---|---|
| | | | | n | Aver. reserve capacity % | Aver. magnesium capacity % |
| B1 | 1 | 80 | 360 | 2 | 4 | 4.9 |
| B2 | 1 | 80 | 215 | 4 | 0.85 | 1.8 |
| B3 | 1 | 100 | 220 | 3 | 0.50 | 0.65 |
| B4 | 1 | 90 | 169 | 3 | 0.33 | 0.36 |

As is apparent from this table, the reserve may be decomposed at temperatures well below 400° C. (namely, 169° C.).

EXAMPLE 3

This example relates to the preparation of a hydrogen reserve containing magnesium, titanium and molybdenum. The reserve is then subjected to a test consisting of decomposition and reconstitution cycles.

Preparation of reserve C1

From magnesium powder of a particle size of 100μ and a powder of a titanium-molybdenum, Ti₃Mo, alloy of a particle size of 15μ, a mixture containing 70 wt. % magnesium and 30 wt. % Ti₃Mo alloy (i.e., 18% titanium and 12% molybdenum) is made. This mixture is compacted under a pressure of 20 tons/cm².

The pellet obtained is subjected to a heat treatment at 900° C. for 3 hr. under a helium stream.

It is hydrogenated for 3 min. at 170° C. at a pressure of 80 bars.

Thus the reserve C1, whose initial capacity is 3.05%, is obtained.

Decomposition and reconstitution test

The reserve C1 is subjected to decomposition and reconstitution cycles.

The conditions and results of the tests are summarized in Table 4 which follows.

Table 4

| Reserve | Decomposition pressure, bars | Reconstitution pressure, bars | Temperature of decomposition and reconstitution, °C. | Average capacity over n cycles | | |
|---|---|---|---|---|---|---|
| | | | | n | Aver. reserve capacity % | Aver. magnesium capacity % |
| C1 | 1 | 80 | 287 | 3 | 0.87 | 1.24 |

As may be seen from this table, the reserve in accordance with the invention has a capacity that is reversible at a temperature of less than 300° C.

We claim:

1. In a combined process for the storage and production of hydrogen from a magnesium-containing hydrogen reserve by storing the hydrogen in the reserve by hydrogenation thereof, decomposing the reserve to produce hydrogen, and reconstituting the reserve by hydrogenation; the improvement comprising incorporating in said reserve from 1 to 99.9 wt. % of magnesium and a dope selected from the group consisting of titanium-nickel, and titanium-molybdenum.

2. Process in accordance with claim 1, wherein the dope is titanium and nickel.

3. Process in accordance with claim 2, wherein they hydrogen reserve is formed and reconstituted at a temperature between 150° and 380° C. and at a pressure between 10 and 100 bars.

4. Process in accordance with claim 1, wherein the dope is titanium and molybdenum.

5. Process in accordance with claim 4, wherein the hydrogen reserve is formed and reconstituted at a temperature between 150° and 380° C. and at a pressure between 10 and 100 bars.

6. Process in accordance with claim 1, wherein the reserve contains from 54 to 99.9 wt. % of magnesium.

7. Process in accordance with claim 6, wherein the hydrogen reserve is formed and reconstituted at a temperature between 20° and 500° C. and at a pressure between 0.1 and 200 bars.

8. Process in accordance with claim 7, wherein the hydrogen reserve is decomposed at a temperature comprised between 100° and 500° C. and at a pressure between 0.1 and 150 bars.

9. Process in accordance with claim 1, wherein the hydrogen reserve is formed and reconstituted at a temperature between 150° and 380° C. and at a pressure between 10 and 100 bars.

10. Process in accordance with claims 9, 3, or 5 wherein the hydrogen reserve is decomposed at a temperature comprised between 150° and 380° C. and at a pressure between 1 and 10 bars.

* * * * *

UNITED STATES PATENT AND TRADEMARK OFFICE
CERTIFICATE OF CORRECTION

PATENT NO. : 4,200,624
DATED : April 29, 1980
INVENTOR(S) : Alain Muller et al.

It is certified that error appears in the above-identified patent and that said Letters Patent are hereby corrected as shown below:

Column 4, line 53, replace "is about 200°C" by --does not exceed about 300°C--; and Column 6, claim 3, line 41, replace "they" by --the--.

Signed and Sealed this

Twenty-fourth Day of March 1981

[SEAL]

Attest:

RENE D. TEGTMEYER

Attesting Officer

Acting Commissioner of Patents and Trademarks